(12) United States Patent
Fike et al.

(10) Patent No.: US 7,424,419 B1
(45) Date of Patent: Sep. 9, 2008

(54) METHOD AND SYSTEM FOR PROVIDING A VIRTUAL UNIVERSAL SERIAL PORT INTERFACE AND A VIRTUAL STORAGE INTERFACE

(75) Inventors: John M. Fike, Austin, TX (US); Melanie A. Fike, Austin, TX (US); Terence H. Kimball, Cedar Park, TX (US)

(73) Assignee: QLOGIC, Corporation, Aliso Viejo, CA (US)

( * ) Notice: Subject to any disclaimer, the term of this patent is extended or adjusted under 35 U.S.C. 154(b) by 650 days.

(21) Appl. No.: 10/445,695

(22) Filed: May 27, 2003

(51) Int. Cl.
G06F 9/455 (2006.01)

(52) U.S. Cl. .......................... 703/23; 703/24
(58) Field of Classification Search .............. 703/23–24
See application file for complete search history.

(56) References Cited

U.S. PATENT DOCUMENTS

| | | | |
|---|---|---|---|
| 5,604,870 A | 2/1997 | Moss et al. | |
| 5,655,148 A | 8/1997 | Richman et al. | |
| 5,659,794 A | 8/1997 | Caldarale et al. | |
| 5,826,015 A | 10/1998 | Schmidt | |
| 5,898,861 A | 4/1999 | Emerson et al. | |
| 5,923,099 A | 7/1999 | Bilir | |
| 6,067,318 A | 5/2000 | Bailey et al. | |
| 6,230,118 B1 | 5/2001 | Bader et al. | |
| 6,263,384 B1 | 7/2001 | Yanase | |
| 6,298,428 B1 * | 10/2001 | Munroe et al. ............... 711/202 |
| 6,493,770 B1 | 12/2002 | Sartore et al. | |
| 6,493,824 B1 | 12/2002 | Novoa et al. | |
| 6,546,434 B1 | 4/2003 | Snow et al. | |
| 6,651,111 B2 | 11/2003 | Sherman et al. | |
| 6,678,830 B1 | 1/2004 | Mustafa et al. | |
| 6,757,778 B1 | 6/2004 | van Rietschote | |
| 6,816,544 B1 | 11/2004 | Bailey et al. | |
| 6,826,387 B1 * | 11/2004 | Kammer .................... 455/41.2 |
| 6,928,586 B1 * | 8/2005 | Tobias et al. .................. 714/30 |
| 6,950,952 B2 | 9/2005 | Felsman | |
| 7,024,695 B1 | 4/2006 | Kumar et al. | |
| 7,047,462 B2 | 5/2006 | Brown et al. | |
| 7,293,165 B1 | 11/2007 | Tobias | |
| 2003/0017805 A1 | 1/2003 | Yeung et al. | |
| 2004/0025064 A1 | 2/2004 | Felsman | |

(Continued)

OTHER PUBLICATIONS

Qlogic Press Release, entitled "Qlogic Launches Baseboard Management Controller and Announces Support for IPMI Specification", dated Nov. 10, 1999.

(Continued)

Primary Examiner—Hugh Jones
(74) Attorney, Agent, or Firm—Klein, O'Neill & Singh, LLP

(57) ABSTRACT

A virtual universal serial port interface ("USI") and a virtual storage device interface ("VSI") interfacing with a host system and a remote console over a network link is provided. The USI includes a control register that receives control information from a processor and a legacy control register; and a status register that receives information from a legacy control register and based on that information, the processor formats information stored in a buffer destined for transmission over a serial port. The VSI includes, a first register that receives control information from a third register that stores control information sent by a processor used to update a fourth register that notifies the host system.

7 Claims, 9 Drawing Sheets

U.S. PATENT DOCUMENTS

2004/0059862 A1   3/2004   Chan
2004/0198219 A1  10/2004  Malmstrom et al.
2006/0048006 A1   3/2006   Lou
2006/0168099 A1   7/2006   Diamant
2007/0233455 A1  10/2007  Zimmer et al.

OTHER PUBLICATIONS

Qlogic Press Release, entitled "QLogic Introduces First Remote Management Controller on a Chip", dated Sep. 6, 2002.
"Office Action from USPTO dates Jan. 9, 2008 for U.S. Appl. No. 10/445,970".

* cited by examiner

METHOD AND SYSTEM FOR PROVIDING A VIRTUAL UNIVERSAL SERIAL PORT INTERFACE AND A VIRTUAL STORAGE INTERFACE

CROSS REFERENCE TO RELATED APPLICATIONS

This application is related to U.S. patent application, entitled "METHOD AND SYSTEM FOR PROVIDING A VIRTUAL UNIVERSAL SERIAL PORT INTERFACE AND A VIRTUAL STORAGE INTERFACE", filed on even date herewith, with common inventors and assignee, and Ser. No. 10/445,970. The disclosure of the aforementioned application is incorporated herein by reference.

BACKGROUND OF THE INVENTION

1. Field of the Invention

The present invention relates to computing systems, and more particularly to systems using a virtual universal serial port interface and a virtual storage interface.

2. Background

Baseboard management controllers (BMC) are used to monitor the functionality of system boards used in various configurations including servers. Intelligent Platform Management Interface (IPMI) is a standard interface developed by Intel Corporation™ that defines a common interface for a BMC to monitor a server's (or any other computing system's) physical characteristics, for example, temperature, voltage, fans, power supplies and chassis intrusion. IPMI allows automatic and manual recovery functionality, such as local or remote system resets and power on/off operations. IPMI also assists in logging events and alerting out of range events. IPMI specification version 1.5 is incorporated herein by reference in its entirety.

Typically, a BMC is coupled to a host system via an interface that allows IPMI messages. The BMC can monitor the host system and provide data to a remote console (module) via a LAN or any other network. The BMC can also share a LAN controller with the monitored system.

Section 12 of the IPMI specification provides details about the mechanisms provided for transferring IPMI messages between a BMC and remote module using a LAN connection via an Ethernet controller using UDP protocol under the IPv4 protocol, defined below. Typically, UDP datagrams are formatted to contain IPMI requests and response messages.

Currently, when a host communicates with a remote storage device the entire image of the file is taken into host internal memory. This is very expensive and hence not a desirable commercial solution.

In addition, conventional BMC's do not have the ability to direct data traffic from a host to a LAN link. This becomes important if the host sends data that can be used by another device coupled to a LAN link and which has proper software to handle such data.

Currently newer operating systems (for examples Microsoft Windows XP®, code name "Whistler") can redirect all screen display and keyboard exchanges to a serial port instead of a KVM Interface. Hence, a BMC should be able to redirect traffic (for example, keyboard and display) to a LAN link so that a remote console can monitor the information. Hence, a BMC must be capable of emulating a universal serial port so that a host operates normally as if communicating with a serial port, while data is being routed to a LAN link to a remote console or other devices. Conventional BMCs are not capable of emulating a universal serial port interface ("UART").

Although the foregoing discussion has been based on using BMCs, the need for a virtual I/O (i.e. a virtual serial port and virtual storage interface) is not limited to just that environment. Virtual I/O may be used in various other environments, for example, a computing system (including servers) may use a virtual I/O system in discrete logic without using a BMC and avoid unnecessary hardware. The current state of the art does not allow virtual I/O for computing systems.

Therefore, there is a need for a virtual storage interface ("VSI") that will allow a host to send data over a LAN (or any other network) to a remote console without disturbing the host (i.e. the host assumes it is communicating with a storage device). There is also a need for a virtual universal serial port interface ("USI") that will allow communication from the host in a universal serial port format to a remote console, while the host system is unaware of the USI.

SUMMARY OF THE INVENTION

In one aspect of the present invention, a system for emulating a universal serial port interface interfacing with a host system and a remote console over a network link is provided. The system includes, at least, a control register that receives control information from a processor and a legacy control register; and a status register that receives information from a legacy control register and based on that information, the processor formats information stored in a buffer destined for transmission over a serial port.

The processor sends formatted information over the network link. The host system communicates with the legacy control register and a legacy status register as if it was communicating with a serial port device. An interrupt is generated to notify the processor that data has been received from the host system.

In another aspect of the present invention, a method for emulating a universal serial port interface interfacing with a host system and a remote console over a network link is provided. The method includes, receiving information from the host system for transmission via a serial port; updating a legacy status register regarding the information; formatting the information that is to be transmitted via a serial port; transmitting the formatted information via a network link, instead of a serial port; and preparing a response for the host system so that the host system operates as if a normal serial port transmission has occurred.

In yet another aspect of the present invention, a virtual universal serial port interface ("USI") interfacing with a host system and a remote console over a network link is provided. The USI includes a control register that receives control information from a processor and a legacy control register; and a status register that receives information from a legacy control register and based on that information, the processor formats information stored in a buffer destined for transmission over a serial port.

In yet another aspect of the present invention, RS-232 wires and additional cost is not required. Host system is also not modified to communicate serial port data to a remote console.

In yet another aspect of the present invention, a system for emulating a storage device interface interfacing with a host system and a remote console over a network link is provided. The system at least includes, a first register that receives control information from the host system for sending information to a storage device; a second register that is updated based on the control information in the first register; and a third register that stores control information sent by a processor used to update a fourth register that notifies the host system.

The processor formats information received from the host system and transmits the formatted information via the network link, while the host system operates as if it is communicating with a storage device. An interrupt is sent to the processor when the second register is updated.

In yet another aspect of the present invention, a method for emulating a storage device interface interfacing with a host system and a remote console over a network link is provided. The system includes, receiving information from the host system, wherein the information is intended for a storage device; formatting the information from the host system for transmission over the network link; and sending a response to the host system, wherein the response is an image of what the host system would have received if it was sent by the storage device or a storage device controller.

In yet another aspect of the present invention, a virtual storage device interface ("VSI") interfacing with a host system and a remote console over a network link is provided. The VSI includes, a first register that receives control information from the host system for sending information to a storage device; a second register that is updated based on the control information in the first register; and a third register that stores control information sent by a processor used to update a fourth register that notifies the host system.

In one aspect of the present invention, a remote console can receive data via a network link through the VSI. For example, boot code may be sent to remote console via a LAN link, while host system operates normally. In addition, based on the adaptive aspects of the present invention, a complete floppy image is not required to be loaded into host memory and instead individual sectors can be mapped to a file.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures.

DETAILED DESCRIPTION OF THE PREFERRED EMBODIMENTS

Definitions

The following definitions are provided as they are typically (but not exclusively) used in the network environment, implementing the various adaptive aspects of the present invention.

"IPMI": Intelligent Platform Management Interface standard developed by Intel Corp™.

"RMCP": Remote Management Control Protocol defined by DMTF, incorporated herein by reference in its entirety. RMCP is a request-response protocol that can be delivered using UDP datagrams. A copy of the RMCP protocol specification is available from the DMTF website and is incorporated herein by reference in its entirety.

"TELNET": TELNET is the terminal emulation protocol of TCP/IP. TELNET can transfer binary data, support byte macros, emulate graphics terminals, and convey information to support centralized terminal management. TELNET uses the TCP transport protocol to achieve a virtual connection between a server and a client. After connecting, a TELNET server and client enter a phase of option negotiation that determines the options that each side can support for the connection. Each connected system can negotiate new options or renegotiate old options at any time. In general, each TELNET connection attempts to implement all options that maximize performance for the systems involved.

"TCP": Transmission Control Protocol is one of the main protocols in TCP/IP networks. TCP enables two hosts to establish a connection and exchange streams of data. TCP guarantees delivery of data and that packets will be delivered in the same order in which they were sent. IETF RFC793 defines the Transmission Control Protocol (TCP), incorporated herein by reference in its entirety. TCP/IP has been described in "TCP/IP Illustrated The Protocols" Vol. I, by W. Richard Stevens, Published by Addison-Wesley Professional Computing Series, incorporated herein by reference in its entirety.

"UDP": User Datagram Protocol (UDP), defined by IETF RFC768, provides a simple, but unreliable message service for transaction-oriented services. Each UDP header carries both a source port identifier and destination port identifier, allowing high-level protocols to target specific applications and services, among hosts.

To facilitate an understanding of the preferred embodiment, the general architecture and operation of a computing system will initially be described. The specific architecture and operation of the preferred embodiment will then be described with reference to the general architecture and operation of a driver, according to one aspect of the present invention.

Figure 1A:
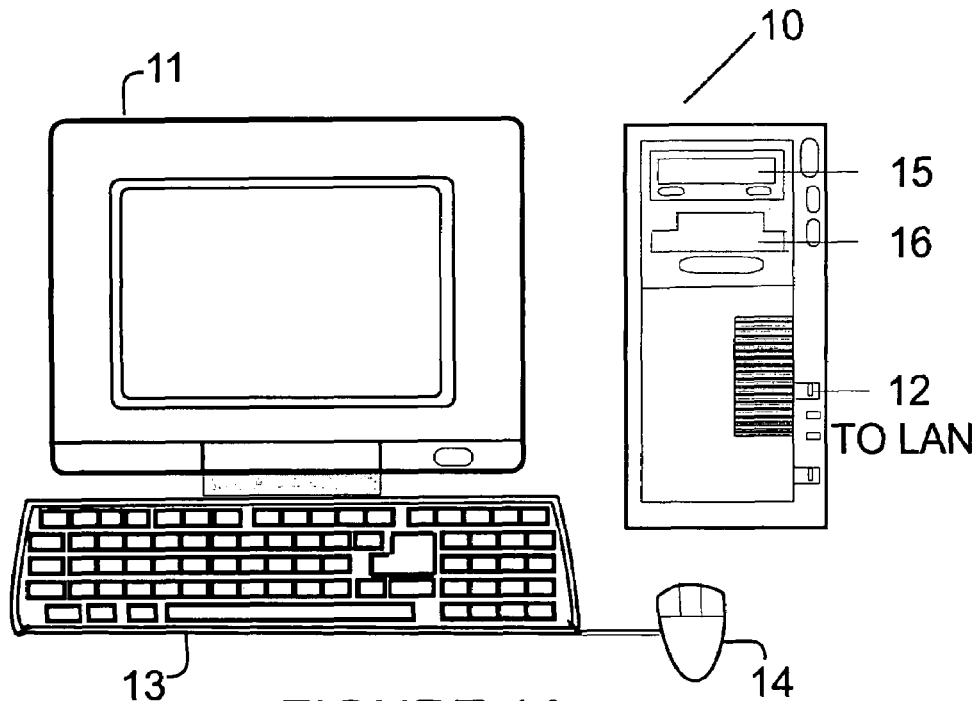
FIG. 1A shows a block diagram of a computing system used according to one aspect of the present invention.

FIG. 1A is a block diagram of a computing system for using the various aspects of the present invention. FIG. 1A includes a host computer 10 and a monitor 11. Computer 10 may be used as a host or remote console, as discussed below.

Monitor 11 may be a CRT type, a LCD type, or any other type of color or monochrome display. Also provided with computer 10 is a keyboard 13 for entering text data and user commands, and a pointing device 14 for processing objects displayed on monitor 11.

Computer 10 includes a computer-readable memory medium such as a rotating disk 15 for storing readable data. Besides other programs, disk 15 can store application programs including computer-executable process steps described below, according to one aspect of the present invention.

Computer 10 can also access a computer-readable floppy disk storing data files, application program files, and computer executable process steps embodying the present invention or the like via a floppy disk drive 16. A CD-ROM interface (not shown) may also be provided with computer 10 to access application program files, audio files and data files stored on a CD-ROM.

A modem, an integrated services digital network (ISDN) connection, or the like also provides computer 10 a connection to a local area network 12 ("LAN") or any other network, including the Internet or a Wireless Network. LAN as used in this specification includes any type of computer network.

It is noteworthy that the invention is not limited to computing system 10 architecture. Any computing device for example, a notebook or laptop computer, capable of interfacing with a BMC may be used to implement the executable process steps described below.

Figure 1B:
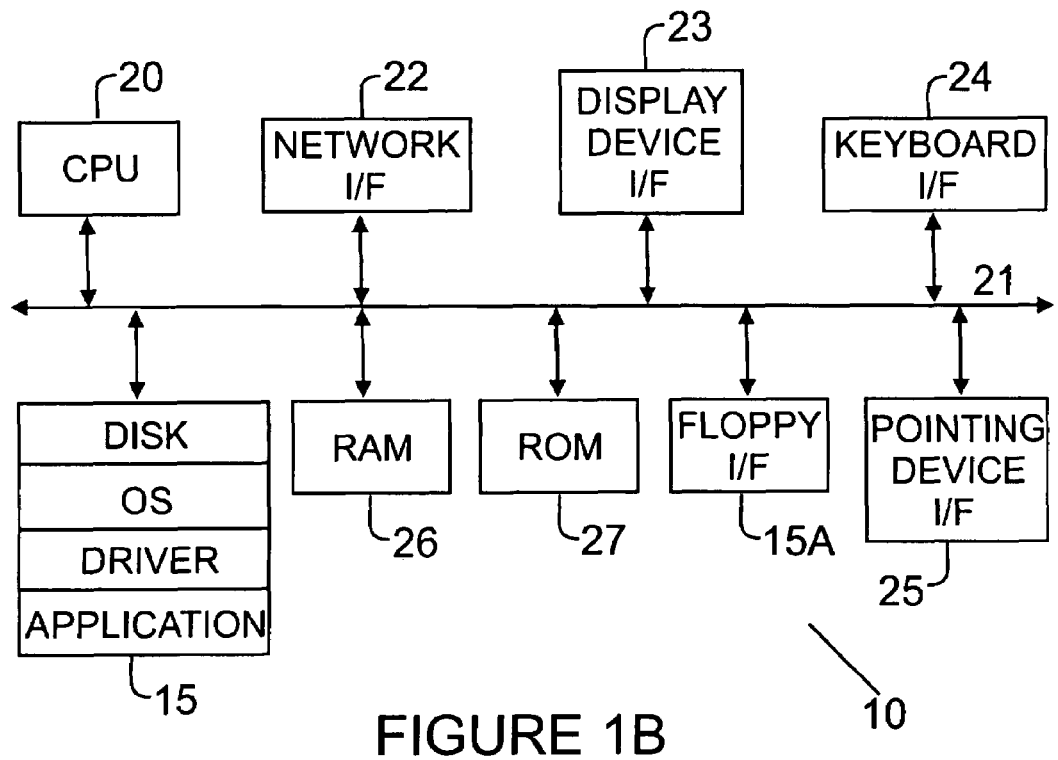
FIG. 1B shows a block diagram of the internal architecture of the computing system in FIG. 1A.

FIG. 1B is a block diagram showing the internal functional architecture of computer 10. As shown in FIG. 1B, computer 10 includes a central processing unit ("CPU") 20 for executing computer-executable process steps and interfaces with a computer bus 21. CPU 20 may be a Pentium™ class processor sold and marketed by Intel Corp™ or any other processor. Among other components, computer 10 includes a network interface 22, a display device interface 23, a keyboard interface 24, a pointing device interface 25, a rotating disk 15 and a floppy disk drive interface 15A.

Network interface 22 provides computer 10 with connectivity to LAN 12.

As described above, disk 15 stores operating system program files, application program files, and other files. Some of these files are stored on disk 15 using an installation program. For example, CPU 20 executes computer-executable process steps of an installation program so that CPU 20 can properly execute the application program.

A random access main memory ("RAM") 26 also interfaces to computer bus 21 to provide CPU 20 with access to memory storage. When executing stored computer-executable process steps from disk 15 (or other storage media such as floppy disk 16 or LAN connection 12), CPU 20 stores and executes the process steps out of RAM 26.

Read only memory ("ROM") 27 is provided to store invariant instruction sequences such as start-up instruction sequences or basic input/output operating system (BIOS) sequences for operation of keyboard 13.

Figure 1C:
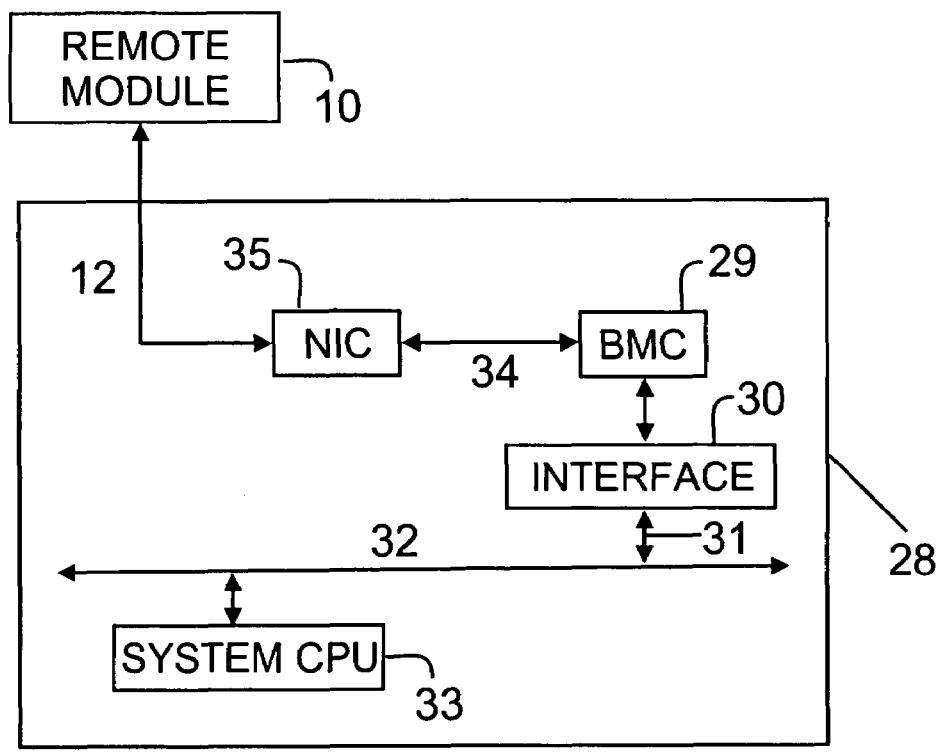
FIG. 1C shows a block diagram of a host system using a board management controller ("BMC") that is operationally coupled to a remote module, according to one aspect of the present invention.

FIG. 1C is a block diagram of the overall system using a BMC 29 to monitor a host system 28. Host system 28 includes a system CPU 33, which may be a Pentium™ class processor sold and marketed by Intel Corp™ or any other processor. System CPU 33 is operationally coupled to system bus 32 that can transmit and receive IPMI messages 31 via interface 30 from BMC 29.

BMC 29 is operationally coupled to a network interface card (NIC) 35 that operationally couples BMC 29 with LAN 12. In one aspect of the present invention, Intel 82545 Ethernet Controller™ sold by Intel Corporation™ may be used to couple BMC 29 to LAN 12.

Bus 34 operationally couples BMC 29 to NIC 35. In aspect of the present invention, bus 34 may be a SMbus. It is noteworthy that the adaptive aspects of the present invention are not limited to SMbus or type of NIC 35, any other bus or type of NIC 35 may be used to implement the adaptive aspects of the present invention.

Remote monitoring module may include a computing system 10 for interacting with BMC 29 via LAN 12.

It is noteworthy that BMC 29 may be integrated with NIC 35 and hence can provide network connectivity and system monitoring.

Also, the term BMC as used through out this specification is not intended to limit the adaptive aspects of the present invention. For example, the USI and VSI, according to the present invention, and described below, may be implemented in discrete logic or in a single ASIC or integrated with a BMC.

Figure 1D:
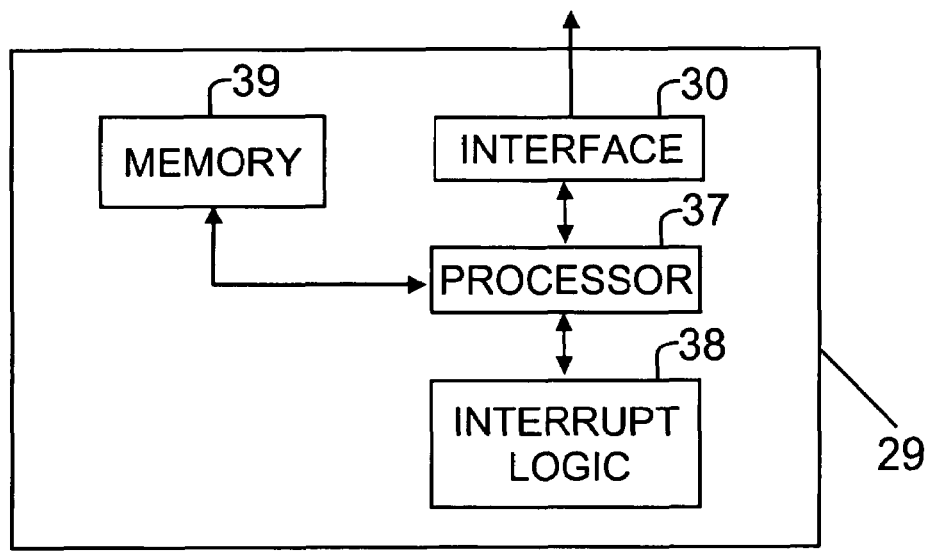
FIG. 1D is a block diagram of the BMC of FIG. 1C.

FIG. 1D shows a top-level block diagram of BMC 29 that can monitor host system 28 via host bus 28A. BMC 29 includes a processor 37 that can load firmware (processor executable process steps) from an external memory (not shown) to monitor other system boards. Processor 37 may be an ARM® processor or any other type of processor.

In one aspect, the external memory may be an Erasable Programmable Read Only Memory (EPROM) or FLASH memory. Typically, firmware is loaded into memory 39 for execution. In one aspect, memory 39 may also be a Static Random Access Memory (SRAM).

It is noteworthy, that the invention is not limited to any particular memory type or structure. The foregoing examples are merely to illustrate the adaptive aspects of the present invention.

Also provided with BMC 29 is an interrupt logic 38 that interrupts processor 37 for various functions and based on various timers (not shown). BMC 29 is provided with interface 30 that operationally couples BMC 29 to host system 28. In one aspect, interface 30 may be a low pin count ("LPC") interface.

Figure 1E:
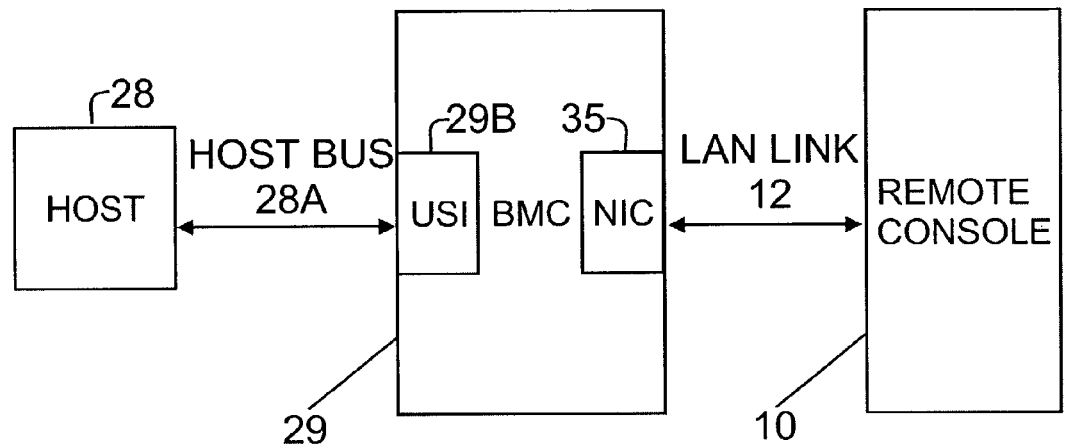
FIG. 1E is a block diagram showing a USI, according to one aspect of the present invention.

FIG. 1E shows a top-level block diagram of a BMC 29 with a USI 29B that allows host system 28 to communicate with remote console 10 over a LAN link 12 via a NIC 22, according to one aspect of the present invention. USI 29B is a virtual serial port interface that receives data for a serial port from host system 28 via host bus 28A, and transmits that data to remote console 10. Host system 28 is not aware that USI 29B is a virtual interface and assumes that it is communicating over a regular serial port interface.

Figure 1F:
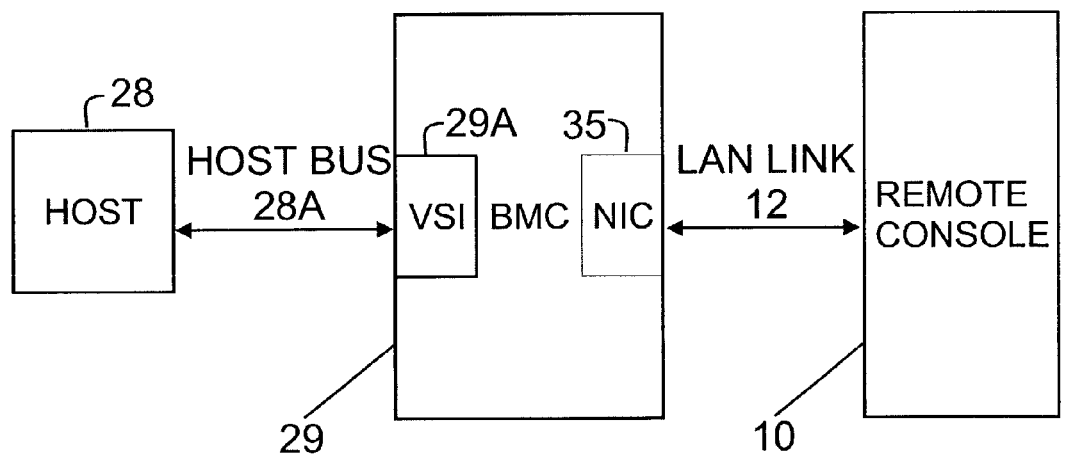
FIG. 1F is a block diagram showing a VSI, according to one aspect of the present invention.

FIG. 1F shows a block diagram with VSI 29C which allows BMC 29 to route data destined for a storage media from host 28 via host bus 28A, to remote console 10 over LAN link 12. Again, host system 28 does not realize that it is communicating with a virtual interface. Instead host system 28 goes through its' normal processing as if it is communicating with a regular storage media (for example, a floppy disk).

The block diagrams of FIGS. 1E and 1F have been shown to illustrate the adaptive aspects of the present invention and not to limit the present invention. For example, BMC 29 may include both USI 29B and VSI 29C (as shown in FIG. 2B) on the same chip, in one aspect of the present invention. Also, USI 29B and VSI 29C may be a part of NIC 35.

Figure 2A:
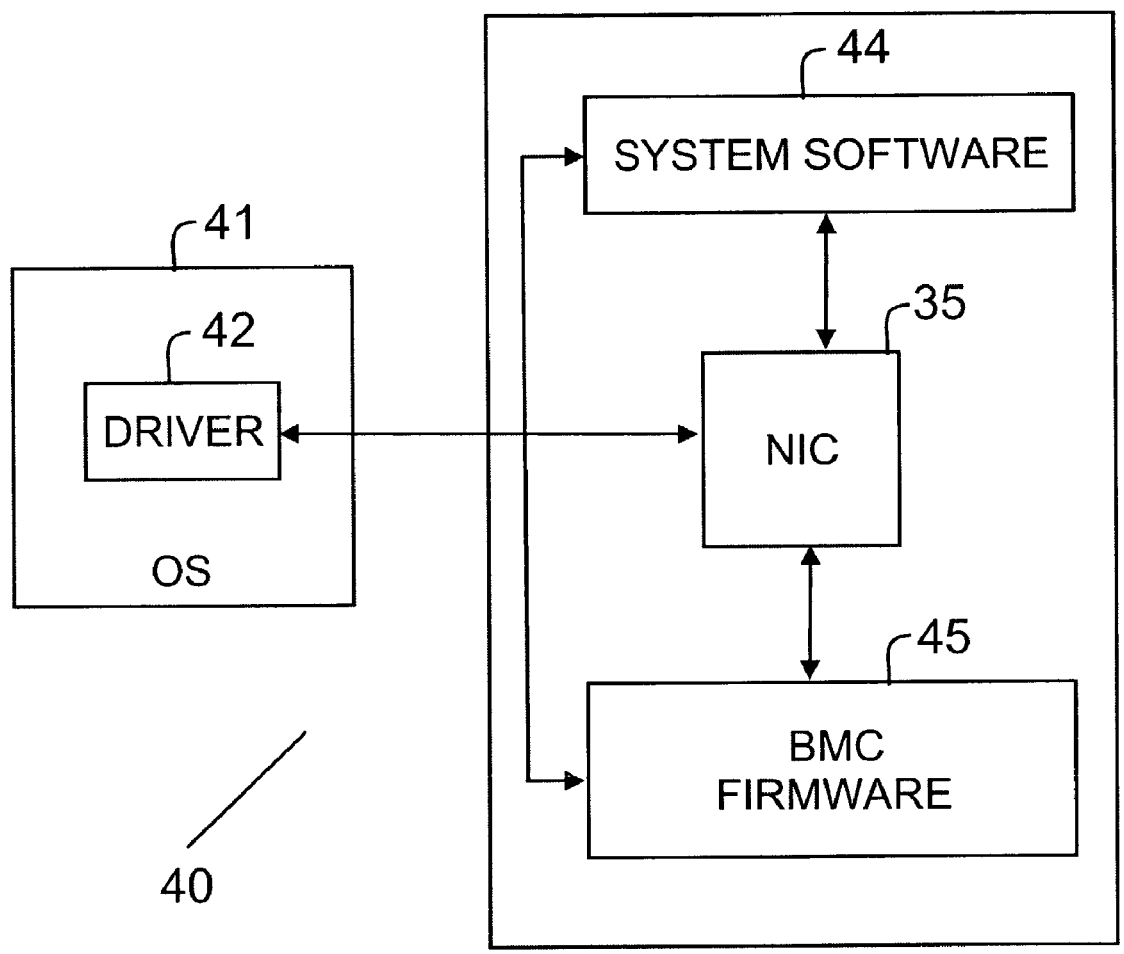
FIG. 2A is a top-level block diagram of a system according to one aspect of the present invention.
Figure 2B:
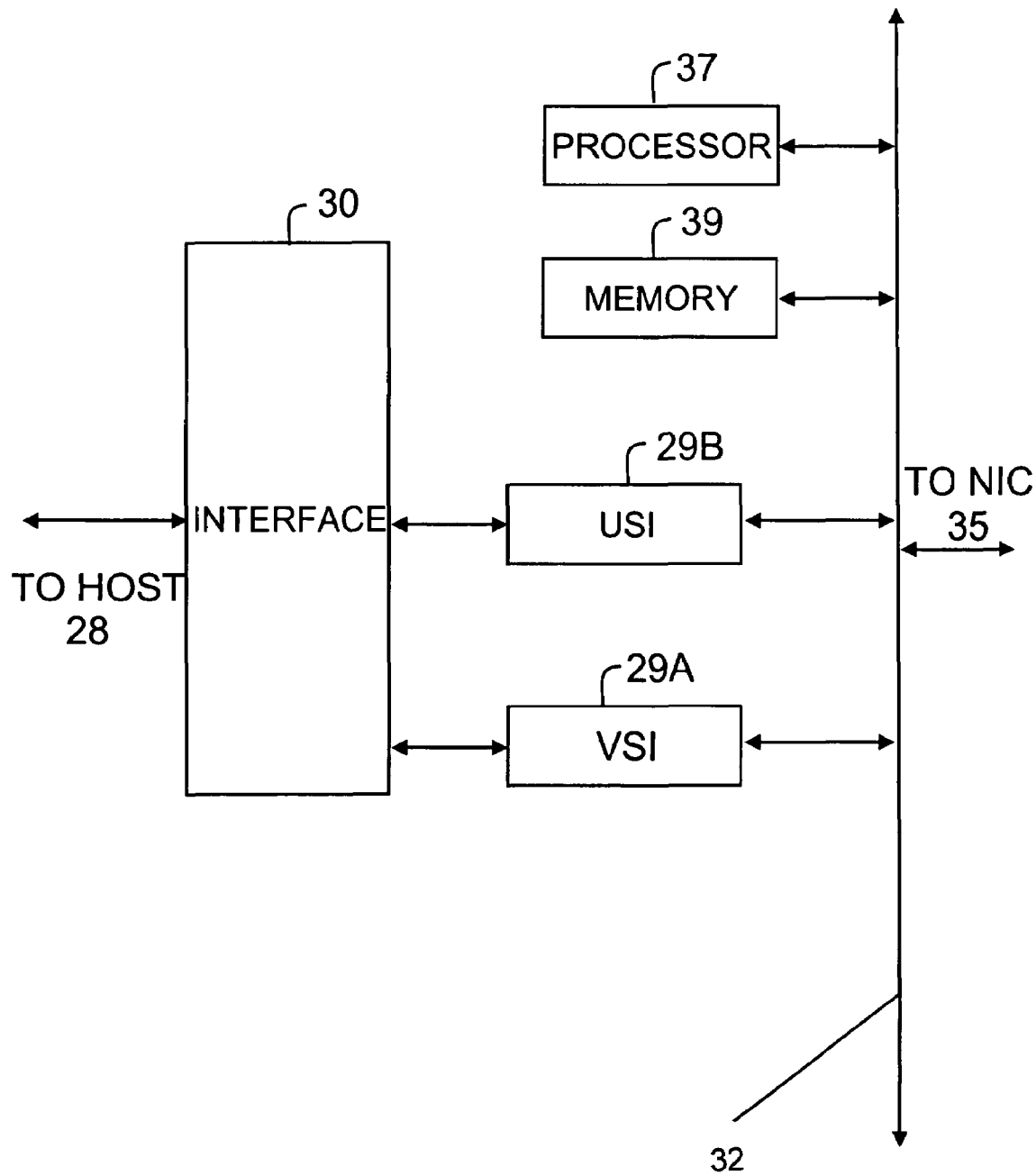
FIG. 2B shows a top-level block diagram of a BMC with a USI and VSI, according to one aspect of the present invention.

FIG. 2A is a block diagram of a system 40 that is used for interfacing BMC 29 with remote module 10. System 40 includes a driver 42 that runs under an operating system 41. In one aspect of the present invention, operating system 41 may be a Window™ or Linux™ based. Driver 42 may be located at disk 15 or downloaded upon demand via LAN 12 or any other network, including the Internet (not shown).

Also included in System 40 is system software 44 that runs on host system 28, and BMC firmware 45 that operates BMC 29 and is operationally coupled to system software 45. System software 44 may include the operating system used for host 28.

NIC 35 may include firmware and/or state machines that allowing connectivity to LAN 12.

FIG. 2B shows a top-level block diagram with USI 29B and VSI 29A (also referred to as VSI 29C (FIG. 5, used interchangeably throughout this specification) operationally coupled to host system 28 via interface 30. The details of USI 29B and VSI 29A will now be described.

Universal Serial Port Interface

Figure 3:
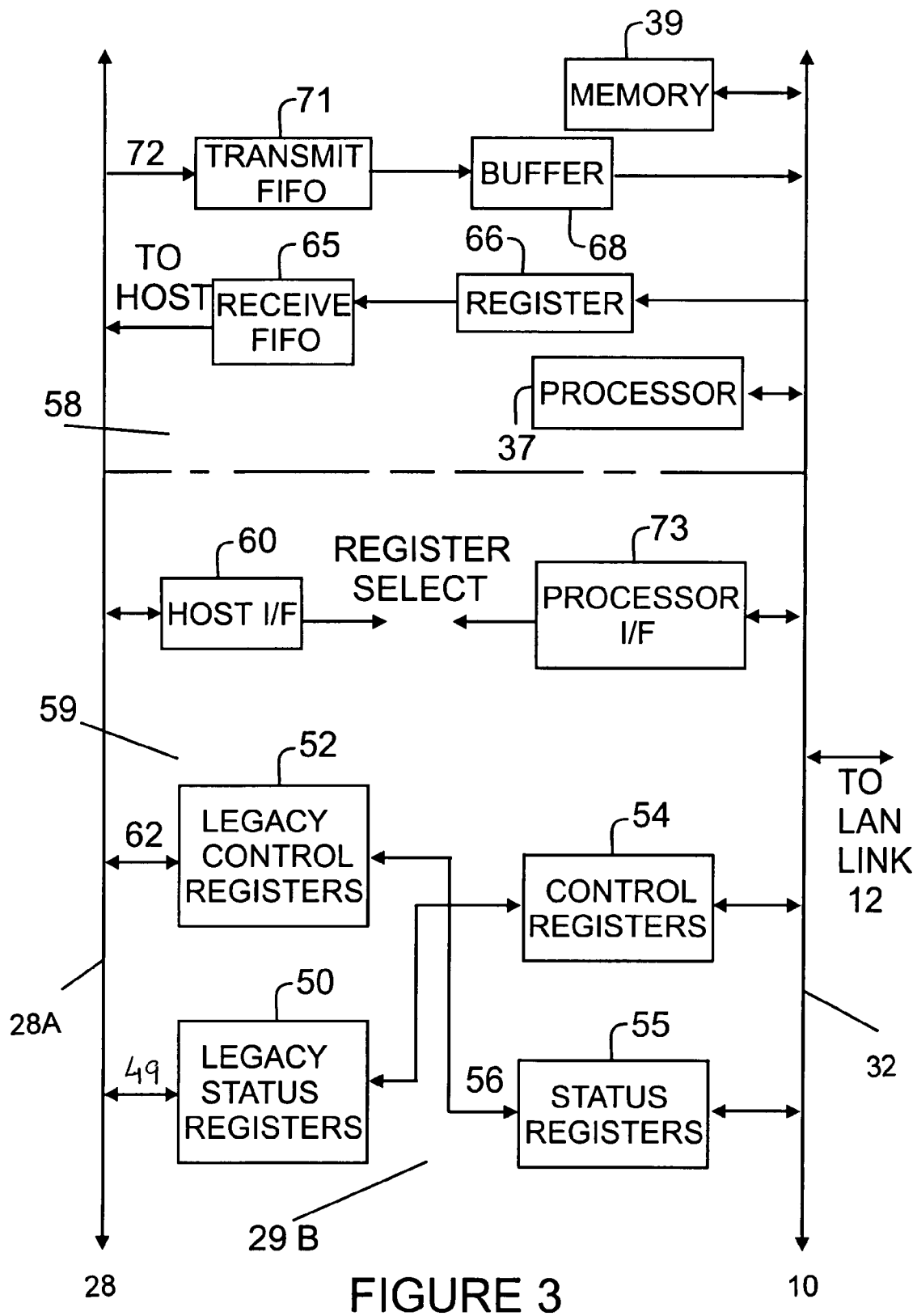
FIG. 3 is a block diagram of a virtual universal serial port interface ("USI"), according to one aspect of the present invention.

FIG. 3 shows a block diagram of USI 29B (shown as segment 59). It is noteworthy that USI 29B may be used in a BMC or as an independent module or with VSI 29C, described below.

USI 29B includes a host interface module 60 that receives address and data information from host 28 for normal communication via a serial port. USI 29B also includes two sets of control and status registers. Legacy control register 52 and legacy status registers 50 are typical registers that host system 28 uses to communicate to a serial port device. Control registers 54 and status registers 55 are used by processor 37 to emulate a serial port.

Control information 62 from host 28 is received by control register(s) 52 for normal communication with a serial port. Thereafter, control information 56 is sent to status registers 55

Control information 56 is accessed by firmware running on processor 37 via processor interface module 73. Processor 37 uses the control information and maps the various characters to emulate a serial port interface. Hence, for host system 28, this is normal serial port transmission. After processor 37 completes the emulation, it populates registers 50 and based on that an interrupt is sent to host 28 via 49.

Segment 58 of FIG. 3 shows various components used for transmitting information to and from host system 28. Segment 58 may be a part of BMC 29 where USI 29B is located (FIG. 2B). Host system 28 sends characters 72 for transmission. These are stored in a transmit FIFO 71 and then sent to buffer register 68. Based on status registers 55 information (56), processor 37 takes information from buffer register 68, reformats the information and sends it to LAN link 12 to a remote console 10.

It is noteworthy that there is no RS-232 wire for transmitting characters from host system 28. Instead, processor 37 sends data to remote console 10 via LAN link 12, while USI 29B emulates a UART interface so that host system 28 acts as if normal serial port transmission is taking place.

Control registers 54 receive input from the firmware running on processor 37. Control registers 54 are used to communicate with status registers 50 via 53. In one aspect if data needs to be read by host system 28, control registers 54 indicate the same to status registers 50 and then data is read by host system 28.

Data may be sent to host system 28 via transmit registers 66 and a receive FIFO 65.

Figure 4:
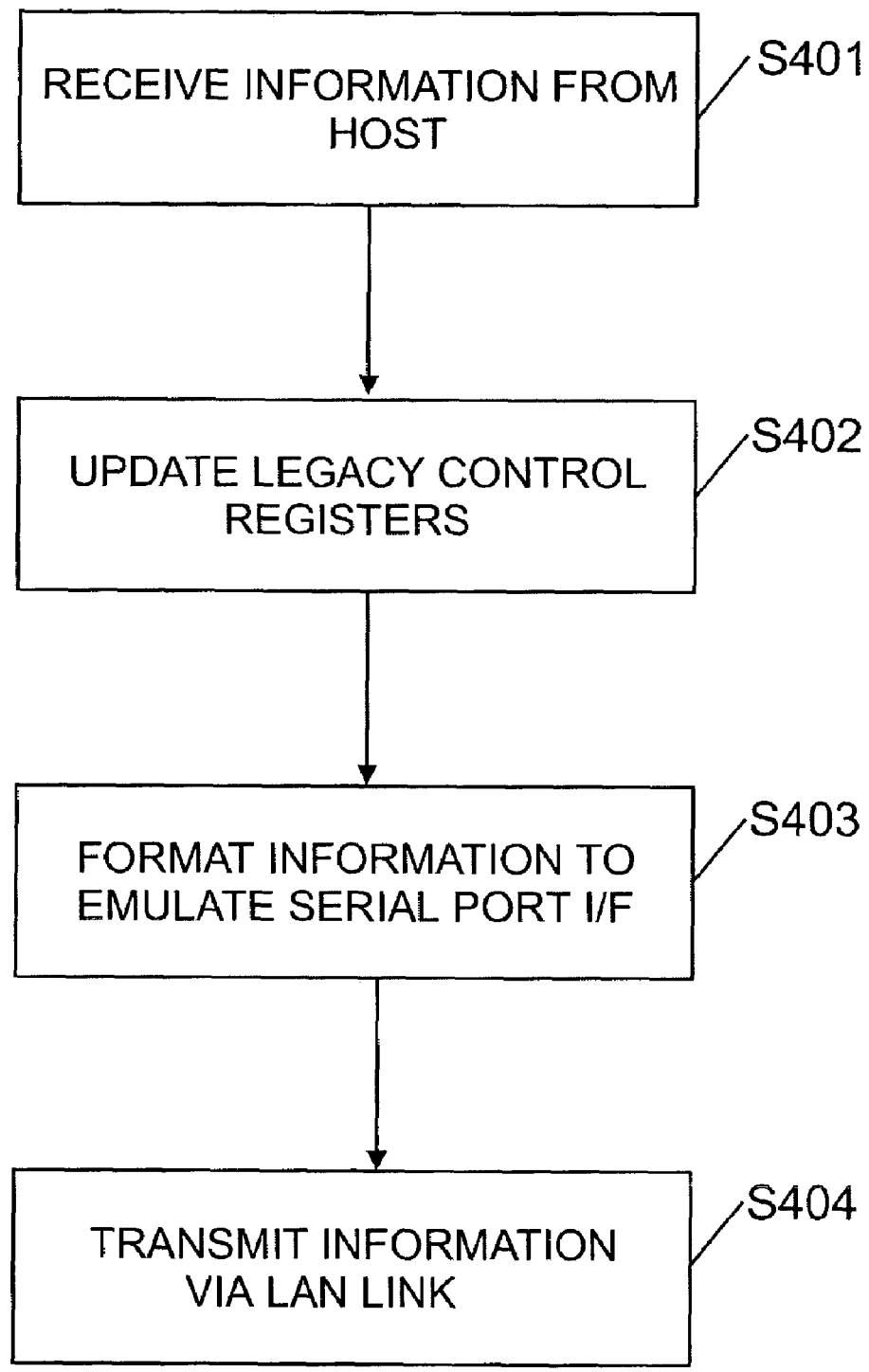
FIG. 4 is a flow diagram of executable process steps using the USI, according to one aspect of the present invention.

FIG. 4 shows a block diagram of executable process steps for emulating a serial port in a BMC, according to one aspect of the present invention.

Turning in detail to FIG. 4, in step S401, information is received from host system 28. Information may include address, data, command and/or control instructions. The characters for transmission are stored in FIFO 71.

In step S402, host system 28 updates control registers 52. This information is then sent to status registers 55 that allow firmware to format the characters received from host system 28.

In step S403, processor 37 formats information from host system 28 for transmission. Processor 37 emulates a standard serial port interface so that host system 28 operates as if it is communicating with a serial port interface.

In step S404, processor 37 transmits the formatted information from buffer 68. Formatted information may be moved to memory 39 before it is sent to remote console 10 or to any other location via LAN link 12.

In one aspect of the present invention, RS-232 wires and additional cost is not required. Host system 28 is not modified to communicate serial port data to a remote console.

Virtual Storage Interface

Figure 5:
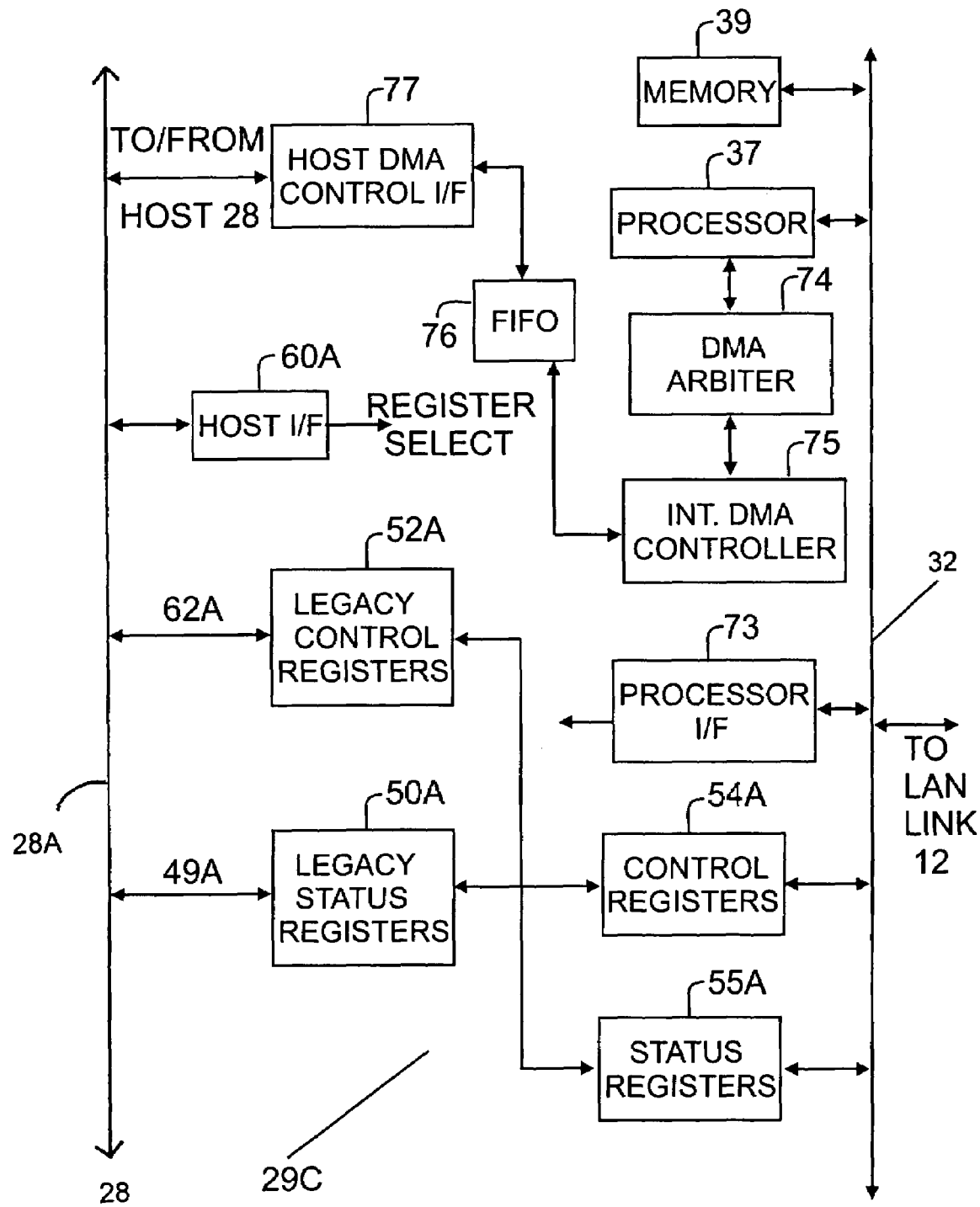
FIG. 5 is a block diagram of a virtual universal storage interface, according to one aspect of the present invention.

FIG. 5 shows a block diagram of VSI 29C according to one aspect of the present invention. It is noteworthy that VSI 29C may be used in a BMC or as an independent module or with USI 29B, described above. VSI 29C includes host DMA control interface (I/F) 77 that controls access to a read and write FIFO buffer 76. Interface 77 is controlled by host system 28.

VSI 29C also includes an internal DMA controller 75 that is controlled by processor 37 and allows processor 37 to access FIFO (or buffer) 76 when data is to be read or written to a storage device.

When host system 28 needs to communicate to a storage device (for example, a floppy disk), there are three different phases, namely, the command phase, execution phase and result phase. During the command phase, host system 28 sends a particular command, for example, a "calibration command". It is noteworthy that the present invention is not limited to any particular command.

The command is received in buffer 76 and a DMA interrupt is sent to processor 37 via a DMA arbiter 74. Processor 37 evaluates the command and executes the command. Thereafter, processor 37 (via firmware) builds a result image in response to the command and sends the result image to buffer 76. The result image is then read by host system 28.

If the command pertains to a storage device, processor 37 builds a result image that host system 28 would have received from a storage device interface (for example, a floppy interface). Hence, host system 28, does not realize that processor 37 is responding to a request, instead of a device specific interface.

Control registers 52A are typical legacy registers that are used by host system 28 to process control commands via 62A. The control commands are sent to status registers 55A and processor 37 gets an interrupt. Processor 37 reads the control information from registers 55A and then builds a result image. Processor 37 uses control registers 54A to store control information. This information is also used to update status registers 50A that indicates to host system 28 (via 49A) that something needs to be done, for example, a result image is ready etc.

Processor 37 uses control registers 54A and status registers 55A to emulate a virtual storage device interface, for example, a floppy disk.

A remote console 10 can receive data via a LAN link through VSI 29C. For example, boot code may be sent to remote console 10 via LAN link, while host system 28 operates normally.

Processor 37 reads information from buffer 76 sequentially and breaks the data into sector and/or cylinder files. Hence, based on the adaptive aspects of the present invention, a complete floppy image is not required to be loaded into memory and instead individual sectors are mapped to a file.

Figure 6:
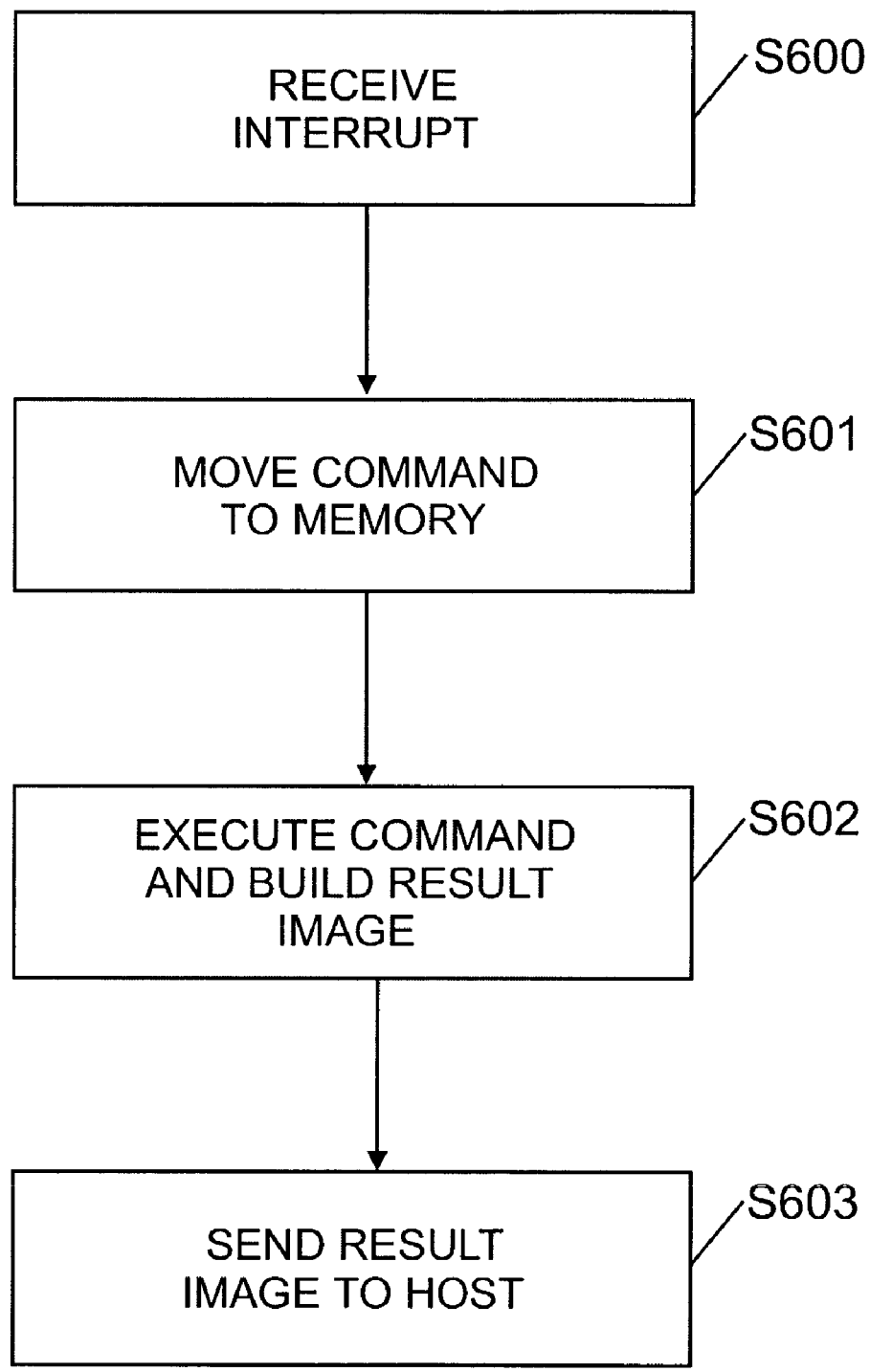
FIG. 6 is a flow diagram for using the virtual storage interface, according to one aspect of the present invention.

FIG. 6 is a flow diagram of using VSI 29C, according to one aspect of the present invention. While VSI 29C is being used, host system 28 operates as if it was interfacing with a storage device. Turning in detail to FIG. 6, in step 600, an interrupt is received by processor 37 when host system 28 sends a command. The command is stored in FIFO 76.

In step S601, processor 37 moves the command to memory 39.

In step S602, processor 39 executes the command and processor 37 builds a result image in response to the command.

In step S603, the result image is sent to host system 28. In one aspect, FIFO 76 is used to send the result image to host system 28.

Although the present invention has been described with reference to specific embodiments, these embodiments are illustrative only and not limiting. For example, the USI and VSI described above may be implemented in a FPGA (field programmable gated array), an application specific integrated circuit (ASIC), or as a part of a system monitoring system (e.g. BMC). Many other applications and embodiments of the present invention will be apparent in light of this disclosure and the following claims.

What is claimed is:

1. A base board management controller (BMC) interfacing with a host system and a remote console over a network link, comprising:

a virtual storage device interface that includes (a) a first control register for storing a command received from the host system for sending information to a storage device; and (b) a first status register that is updated after the command is received from the host system; and a processor that receives an interrupt after the first status register is updated; wherein the processor (i) executes the command received from the host system; (ii) builds a result image in response to the command, the result image being similar to a response that the host system expects to receive from the storage device; and (iii) stores control information in a second control register of the virtual storage device interface;

wherein the control information is used to update a second status register of the virtual storage device interface, and the updated second status register indicates to the host system that the result image is ready to be read; and wherein the BMC used for monitoring a system board of the host system also emulates the storage device and sends the information via the network link to the remote console instead of sending the information to the storage device, while the host system operates as if it is communicating with the storage device.

2. The BMC of claim 1, wherein the processor formats information received from the host system and transmits the formatted information via the network link to the remote console, instead of sending the information to the storage device.

3. The BMC of claim 1, wherein the processor reads the information received from the host system and maps individual sectors to a file instead of loading an entire storage device image.

4. The BMC of claim 1, wherein an interrupt is sent to the host system when the second status register is updated and the host system retrieves the result image created by the processor, which is similar to a response that the host system expects from the storage device.

5. A method for transmitting information received from a host system to a remote console over a network link, instead of transmitting the information to a storage device, comprising:

receiving a command from the host system to send the information to the storage device;

storing the command in a first control register of a virtual storage device interface of a baseboard board management controller (BMC), the BMC interfacing with the host system and the remote console;

updating a first status register of the virtual storage device interface with the received command:

generating an interrupt for a BMC processor after the first status register is updated;

executing the command, wherein the BMC processor executes the command;

generating a response to the command, wherein the BMC processor generates the response, which is similar to a response that the host system expects to receive from the storage device;

updating a second status register of the virtual storage device interface which indicates to the host system the response created by the BMC processor is ready to be read; and sending the information to the remote console, instead of sending the information to the storage device, while the host system operates as if it is communicating with the storage device; wherein the BMC used for monitoring a system board of the host system, emulates the storage device and sends the information via the network link to the remote console.

6. The method of claim 5, wherein an interrupt is sent to the host system after the second status register is updated and the host system retrieves the response created by the BMC processor, which is similar to a response that the host system expects from the storage device.

7. The method of claim 5, wherein the BMC processor reads the information from the host system and maps individual sectors to a file instead of loading an entire storage device image.

* * * * *

UNITED STATES PATENT AND TRADEMARK OFFICE
CERTIFICATE OF CORRECTION

PATENT NO. : 7,424,419 B1  Page 1 of 1
APPLICATION NO. : 10/445695
DATED : September 9, 2008
INVENTOR(S) : John M. Fike et al.

It is certified that error appears in the above-identified patent and that said Letters Patent is hereby corrected as shown below:

On the Title page, in field (57), under "Abstract", in column 2, line 10, after "from" insert -- the host system for sending information to a storage device; a second register that is updated based on the control information in the first register; and --.

In column 1, line 59, delete "examples" and insert -- example, --, therefor.

In column 7, line 32, after "55" insert -- . --.

In column 10, line 22, in Claim 5, after "baseboard" delete "board".

In column 10, line 26, in Claim 5, delete "command:" and insert -- command; --, therefor.

Signed and Sealed this

Eleventh Day of May, 2010

David J. Kappos
*Director of the United States Patent and Trademark Office*